Nov. 5, 1957　　　　J. A. CUPLER II　　　　2,812,221
JEWEL BEARING SUPPORT
Filed Nov. 23, 1951
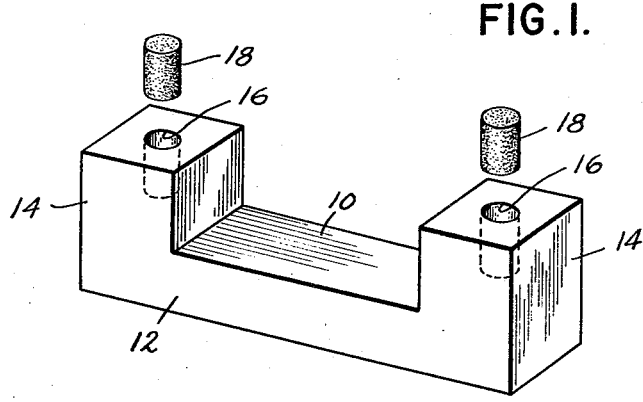
FIG. 1.
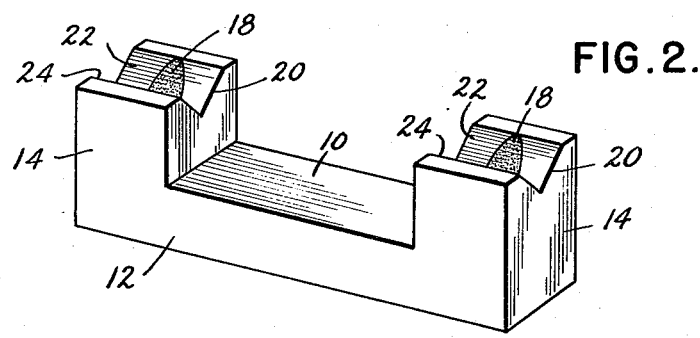
FIG. 2.
FIG. 3.
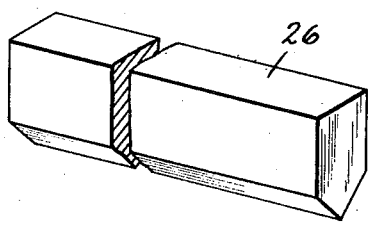
FIG. 5.
FIG. 4.
INVENTOR
JOHN A. CUPLER, II
BY
ATTORNEY

United States Patent Office 2,812,221
Patented Nov. 5, 1957

2,812,221

JEWEL BEARING SUPPORT

John A. Cupler II, Cumberland, Md.

Application November 23, 1951, Serial No. 257,920

1 Claim. (Cl. 308—2)

This invention relates to bearings and methods of producing them and constitutes a continuation-in-part of application Serial No. 188,799, filed October 6, 1950, for "Drilling Machines," now Patent No. 2,607,244, dated August 19, 1952.

A substantial proportion of the errors encountered in machining operations can be attributed to eccentricities occurring in the machine tools employed, the adverse effects being more pronounced where the work is shifted from one machine to another or supported on different centers. The problem is greatly magnified where tolerances must be close.

It has now been found that vastly increased accuracy can be achieved by producing one or more cylindrical reference surfaces on a piece of work and thereafter employing such surfaces to support the work during successive machining operations.

In accordance with the present invention, a support provides spaced pairs of line contacts for the cylindrical surface or surfaces of the tool or work defined by spaced V-notches, and in this way, any rotation of the work piece or tool will occur about an axis concentric with the cylindrical surface and any axial movement will necessarily be directed along the same axis.

The support of the present invention comprises a base, a pair of bearings fixed to the base in spaced relationship, each bearing having a pair of convergent substantially plane wear-resistant walls, the walls of one of the bearings being coplanar with those of the other respectively. Preferably, each of the bearings contains an insert in the form of a synthetic jewel, such as a sapphire, providing the convergent substantially plane wear-resistant walls. A portion of the base is preferably relieved between the bearings so that the lines of contact will not be unduly extended, so that in effect, there are a pair of pedestals integrally fixed to the base which provide the bearings. The wear-resistant body received in each bearing will ordinarily be of a material dissimilar from that constituting the base, each such body being received and fixed in a socket provided by each of the pedestals.

This invention also contemplates a method of producing open bearings in fixed spaced relationship comprising forming a body with a pair of spaced V-notches having substantially coplanar walls respectively, and lapping the walls of both of said notches simultaneously with a common tool. Preferably, the V-notches are formed in a pair of spaced fixed wear-resistant bodies, usually in the form of wear resistant synthetic jewel inserts fixed in sockets provided by the body. The lapping of the notch-forming walls is effected until the surfaces of the spaced inserts are coplanar with one another and with the portions of the body contiguous thereto.

A more complete understanding of the invention will follow from a more detailed description based upon the accompanying drawings wherein:

Fig. 1 is a perspective view depicting an intermediate form of the article contemplated by the invention;

Fig. 2 is a perspective view of a completed article;

Fig. 3 is a plan view of the article shown in Fig. 2;

Fig. 4 is a section taken along line 4—4 of Fig. 3; and

Fig. 5 is a perspective view, partially broken away, of a suitable lapping tool for use in the production of the article shown in Fig. 2.

A substantially U-shaped member 10 shown in Fig. 1 comprises a base 12 having upstanding projections or pedestals 14 in spaced relationship. Approximately centrally of each of these pedestals, a socket 16 is formed by drilling or boring to nicely receive a wear-resisting insert 18, in the form of a jewel, usually synthetic, such as a sapphire, ruby, diamond, or other material possessing comparable characteristics.

Then, aligned V-notches 20 are formed in the body 10 and wear-resistant inserts 18, producing a pair of convergent walls 22 and 24 in each of the pedestals 14, the walls 22 and 24 of both bearings being coplanar respectively. Thus, when a piece of work or a tool having a cylindrical surface is supported in the spaced notches, any movement of the tool or work while it is maintained in contact with the walls of the notches, will assure a maintenance of concentricity with respect to the cylindrical surface.

The jewel or similar insert 18 is secured in place in its socket 16 by means of a suitable cement which is permitted to harden before the notches are formed. After the notches are formed to the desired rough dimensions, as by a mechanical lapping operation performed with a tool 26 such as has been depicted in Fig. 5, continued lapping with a medium diamond compound is preferably performed by hand and ultimately, the tool 26 is replaced by a wooden tool of similar shape to produce the final polish with a suitable diamond compound. The body 10 will ordinarily be formed of metal which will be expected to wear much more rapidly than the insert 18 which is primarily a wear-resistant material. In this way, although the adjacent areas of the notch-forming walls may wear to some extent, the inserts 18 will remain serviceable for long periods of time.

Many uses of the product of this invention will occur to the skilled mechanic just as they have occurred already to the present inventor. In the copending application Serial No. 188,799, now Patent No. 2,607,244, dated August 19, 1952, of which this application is a continuation-in-part, the use of such apparatus has been proposed for drilling. It is equally applicable for supporting work pieces as well as tools for all types of operations such as turning, milling, grinding, and various other machine shop practices. Accordingly, the invention should not be restricted in terms of the foregoing description or accompanying drawings beyond the scope of the appended claim.

I claim:

A support comprising a base, a pair of pedestals projecting from said base in spaced relationship containing coplanar surfaces respectively defining V-notches, each pedestal containing a cylindrical socket having a circumference all points of which intersect said surfaces, cylindrical jewel inserts filling said sockets and having exposed surfaces substantially coplanar with one another and with those of their pedestals respectively.

References Cited in the file of this patent

UNITED STATES PATENTS

| | | |
|---|---|---|
| 1,290,564 | Jankower | Jan. 7, 1919 |
| 2,092,180 | Porter | Sept. 7, 1937 |
| 2,121,481 | Flumerfelt | June 21, 1938 |
| 2,182,590 | King | Dec. 5, 1939 |
| 2,368,007 | Delahan et al. | Jan. 23, 1945 |
| 2,483,765 | Hamel | Oct. 4, 1949 |
| 2,681,835 | Green | June 22, 1954 |